United States Patent
Ogawa

[19]

[11] Patent Number: 5,770,004
[45] Date of Patent: Jun. 23, 1998

[54] DRIVING APPARATUS OF TIRE FORMING DRUM

[75] Inventor: Yuichiro Ogawa, Tokyo, Japan

[73] Assignee: Bridgestone Corporation, Tokyo, Japan

[21] Appl. No.: 642,875

[22] Filed: May 6, 1996

[30] Foreign Application Priority Data

May 26, 1995 [JP] Japan .................................... 7-128480

[51] Int. Cl.$^6$ ................................................. B29D 30/24
[52] U.S. Cl. .......................................... 156/398; 156/415
[58] Field of Search .................................. 156/415, 414, 156/416, 417, 398, 123, 130

[56] References Cited

U.S. PATENT DOCUMENTS

| | | | |
|---|---|---|---|
| 3,235,435 | 2/1966 | Pouilloux | 156/415 |
| 3,409,491 | 11/1968 | Pacciarini et al. | 156/415 |
| 3,769,856 | 11/1973 | Casey | 74/675 |
| 3,867,230 | 2/1975 | Van Horn et al. | 156/415 |
| 3,867,231 | 2/1975 | Casey | 156/415 |

FOREIGN PATENT DOCUMENTS

| | | |
|---|---|---|
| 0 509 093 A1 | 10/1992 | European Pat. Off. . |
| 58-14732 | 1/1983 | Japan . |
| 1-198334 | 8/1989 | Japan . |
| 3-187728 | 8/1991 | Japan . |
| 7-24931 | 1/1995 | Japan . |

OTHER PUBLICATIONS

Patent Abstracts of Japan, vol. 007, No. 089, Apr. 13, 1983, JP-A-58-014732.
Patent Abstracts of Japan, Vol. 13, No. 497, Nov. 9, 1989, JP-A-01 198334.
Patent Abstracts of Japan, vol. 10, No. 204, Jul. 17, 1986, JP-A-61 044629.

*Primary Examiner*—Geoffrey L. Knable
*Attorney, Agent, or Firm*—Sughrue, Mion, Zinn, Macpeak & Seas, PLLC

[57] ABSTRACT

A driving apparatus of a tire forming drum in which rotation of left-hand and right-hand bead locking mechanisms and movement of these bead locking mechanisms in directions of approaching and separating from each other can be effected simultaneously. A state of a main shaft and an inner shaft of the driving apparatus of the tire forming drum can be switched between a connected state and a non-connected state by a clutch. The main shaft and the inner shaft are both connected to a differential gear unit. An encoder is fixed to the differential gear unit and can detect the rotational difference between the inner shaft and the main shaft. Connected to the inner shaft are a distance-between-beads changing motor and a distance-between-beads fixing brake. Mounted to the main shaft are a main shaft rotating motor and a disc brake. A left-hand screw and a right-hand screw are formed on the inner shaft and the left-hand and right-hand bead locking mechanisms are screwed on the left-hand screw and the right-hand screw, respectively.

20 Claims, 2 Drawing Sheets

DRIVING APPARATUS OF TIRE FORMING DRUM

BACKGROUND OF THE INVENTION

1. Field of the Invention

The present invention relates to a driving apparatus of a tire forming drum, and particularly to a driving apparatus of a tire forming drum, in which the distance between beads of bead locking mechanisms can be changed.

2. Description of the Related Art

Conventionally, as an example of a driving apparatus of a tire forming drum in which the distance between beads of bead locking mechanisms can be changed, there has been known an apparatus shown in FIG. 2.

In a driving apparatus 70 of a tire forming drum, a shaft section 72 includes a main shaft 74 and an inner shaft 76 rotatably inserted into an interior of the main shaft 74. One end portion 74A of the main shaft 74 and one end portion 76A of the inner shaft 76 can be switched by a clutch 78 between a connected state and a non-connected state. A sprocket 77 is fixed to the end portion 76A of the inner shaft 76 and is connected via a chain 80 to a sprocket 84 fixed to a drive shaft of a motor 82. A disk rotor 88 of a disc brake 86 is mounted at an intermediate portion of the main shaft 74.

A left-hand screw 90 and a right-hand screw 92 are formed on another end portion 76B side of the inner shaft 76. A left-hand bead locking mechanism 94 and a right-hand bead locking mechanism 96 are screwed on the left-hand screw 90 and the right-hand screw 92, respectively. The left-hand bead locking mechanism 94 and the right-hand bead locking mechanism 96 move by rotation of the inner shaft 76 in directions of moving close to and away from each other (the directions of double-headed arrow W in FIG. 2).

An encoder 100 is connected by a rod 98 to the right-hand bead locking mechanism 96 and is provided to detect an amount by which the right-hand bead locking mechanism 96 moves, to realize a distance between the left-hand bead locking mechanism 94 and the right-hand bead locking mechanism 96.

Meanwhile, some of conventional driving apparatuses of the tire forming drum are constructed in that the number of revolutions of the inner shaft is detected by the encoder, and on the basis of the detected results, the distance between the left-hand and right-hand bead locking mechanisms can be realized.

However, with this conventional driving apparatus 70 of the tire forming drum, one motor 82 is used and rotation of the motor 82 is transmitted by the clutch 78 from the inner shaft 76 to the main shaft 74. For this reason, rotation of the left-hand bead locking mechanism 94 and the right-hand bead locking mechanism 96, and movement thereof in the directions in which these mechanisms approach and are separated from each other cannot be carried out simultaneously.

Accordingly, in a case in which the left-hand bead locking mechanism 94 and the right-hand bead locking mechanism 96 are moved in the directions of approaching and separating from each other, portions of beads mounted to the left-hand and right-hand bead locking mechanisms 94, 96, which are disposed at a lower side of a tire forming drum, hang down by their weight. Thus, as compared with other portions of the beads which are disposed at an upper side of the tire forming drum, the portions of the beads at the Lower side of the tire forming drum previously contacts an inner surface of a tire belt member. As a result, the uniformity of a green tire deteriorates.

SUMMARY OF THE INVENTION

In view of the above-described circumstances, it is an object of the present invention to provide a driving apparatus of a tire forming drum in which rotation of left-hand and right-hand bead locking mechanisms and movement thereof in directions of approaching and separating from each other can be effected simultaneously.

In accordance with the present invention, there is provided a driving apparatus of a tire forming drum, comprising: a shaft section having a main shaft and an inner shaft which is rotatably inserted into an interior of the main shaft; a main shaft rotating motor for rotating the main shaft; a brake which prevents rotation of the main shaft; a clutch for switching a state of the main shaft and the inner shaft between a connected state and a non-connected state; an inner shaft rotating motor for rotating the inner shaft; a pair of bead locking mechanisms which are engaged on the inner shaft in such a manner as to be movable along an axial line of the inner shaft in directions of approaching and separating from each other; a differential gear unit connected both to the inner shaft and the main shaft; and an encoder which is connected to the differential gear unit and detects a distance between the pair of bead locking mechanisms from a rotational difference between the inner shaft and the main shaft.

In accordance with the driving apparatus of the tire forming drum of the present invention, a state in which rotation of the main shaft is prevented by the brake is canceled, and when the main shaft is rotated by the main shaft rotating motor, the pair of bead locking mechanisms rotate. At this time, when the main shaft and the inner shaft are brought into a non-connected state by the clutch and the inner shaft is rotated by the inner shaft rotating motor, the pair of bead locking mechanisms engaged on the inner shaft move along the axial line of the inner shaft in the directions of approaching and separating from each other. At the same time, the differential gear unit connected both to the inner shaft and the main shaft operates and the distance between the pair of bead locking mechanisms is detected by the encoder connected to the differential gear unit on the basis of the rotational difference between the inner shaft and the main shaft.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENT

A description will be hereinafter given of a driving apparatus of a tire forming drum according to an embodiment of the present invention with reference to FIG. 1.

Figure 1:
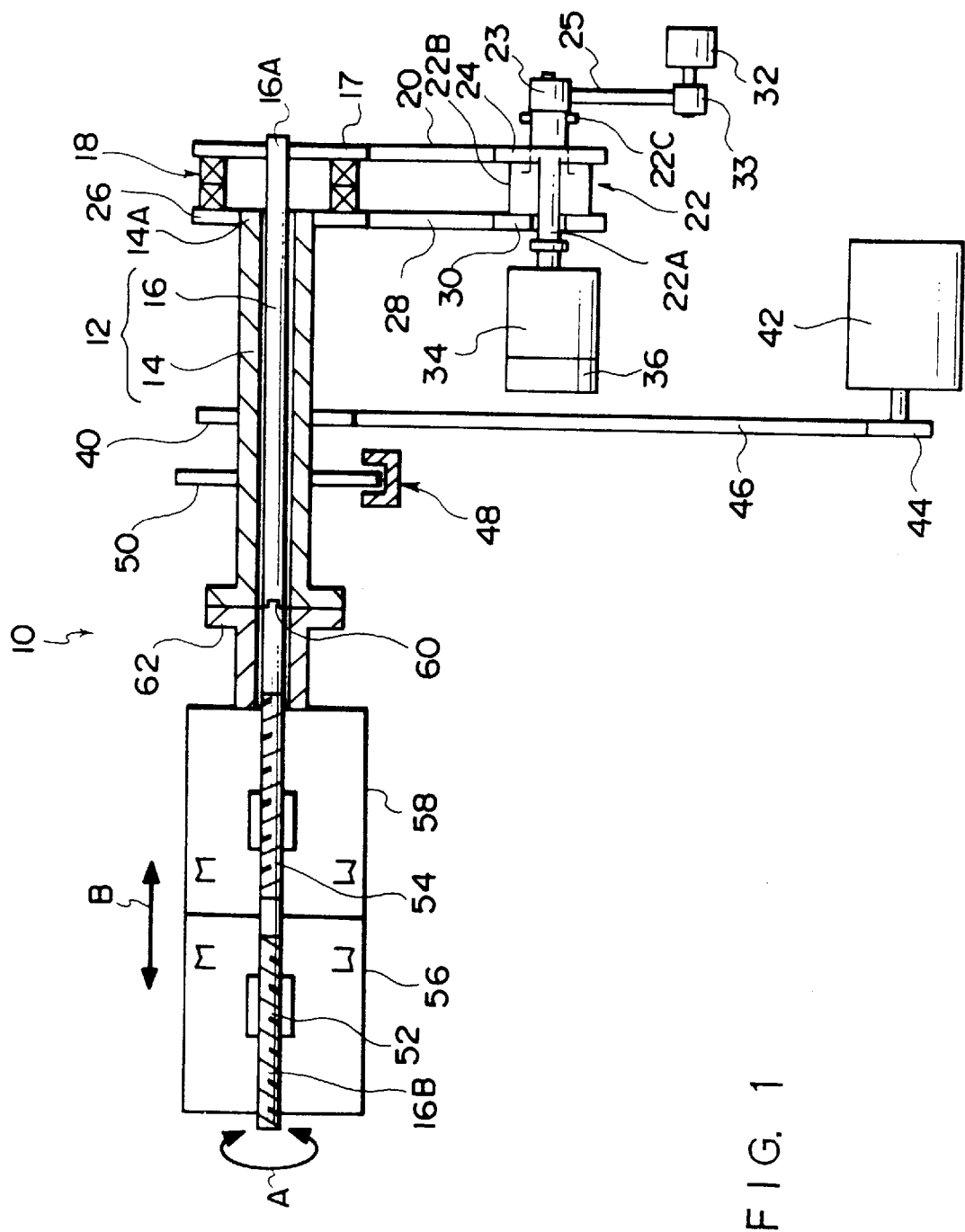
FIG. 1 is a schematic cross-sectional view showing a driving apparatus of a tire forming drum according to an embodiment of the present invention.
Figure 2:
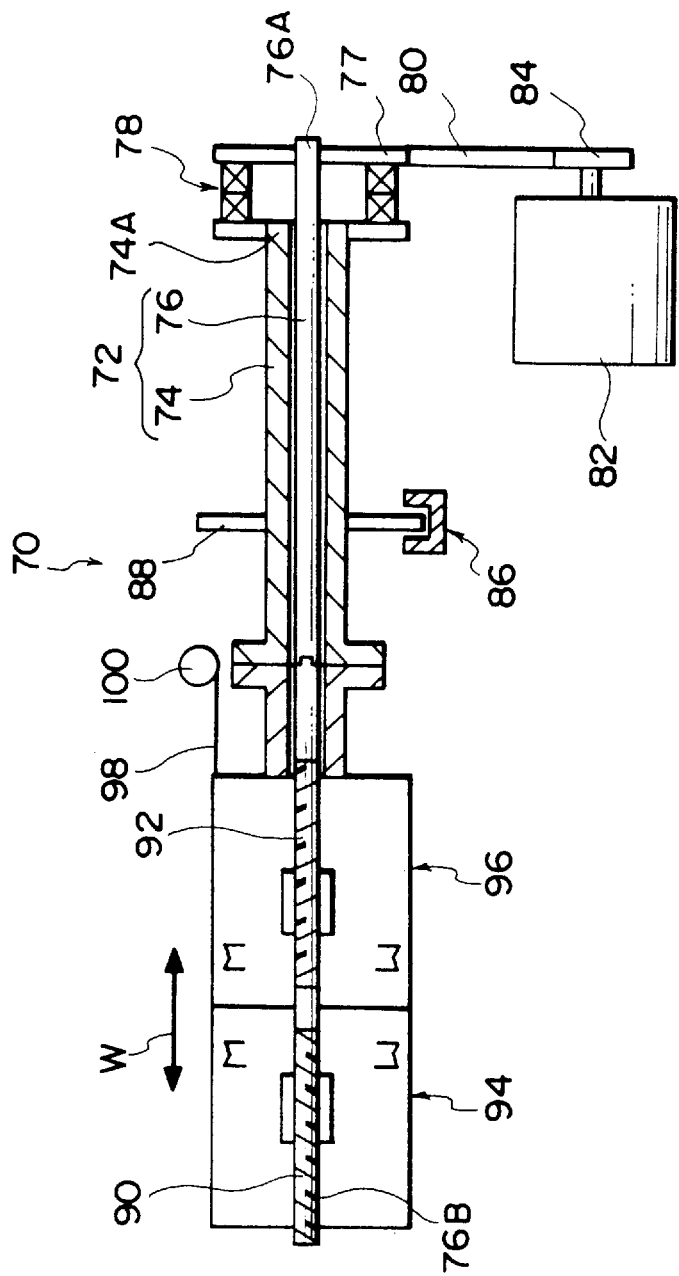
FIG. 2 is a schematic cross-sectional view showing a conventional driving apparatus of a tire forming drum.

As shown in FIG. 1, in a driving apparatus 10 of a tire forming drum of the present embodiment, a shaft section 12 includes a main shaft 14 and an inner shaft 16 which is rotatably inserted into an interior of the main shaft 14. One end portion 14A of the main shaft 14 and one end portion 16A of the inner shaft 16 can be switched by a clutch 18 between a connected state and a non-connected state.

A sprocket 17 is fixed to the end portion 16A of the inner shaft 16 and is connected via a chain 20 to a sprocket 24 which is fixed to an output shaft 22A of a differential gear unit 22. It should be noted that the differential gear unit 22 is well known and a description thereof will be omitted.

On the other hand, a sprocket 26 is fixed to the end portion 14A of the main shaft 14 and is connected via a chain 28 to a sprocket 130 which is fixed to a casing 22B of the differential gear unit 22.

A pulley 23 is fixed to a flange 22C of the differential gear unit 22 and is connected via a timing belt 25 to a pulley 33 fixed to an encoder 32 which serves as a distance-between-beads detecting means. For this reasons, the rotational difference between the inner shaft 16 and the main shaft 14 can be detected by the encoder 32. A distance-between-beads changing motor 34 and a distance-between-beads fixing brake 36 are connected to the output shaft 22A of the differential gear unit 22. The distance-between-beads changing motor 34 serves as an inner shaft rotating means to allow forward arid reverse rotation of the inner shaft.

A sprocket 40 is fixed to an intermediate portion of the main shaft 14 and is connected via a chain 46 to a sprocket 44 fixed to a drive shaft of a main shaft rotating motor 42 which serves as a main shaft rotating means. Further, a disc rotor 50 of a disc brake 48 which serves as a main-shaft rotation stopping means is mounted at an intermediate portion of the main shaft 14.

A left-hand screw 52 and a right-hand screw 54 are formed in vicinities of another end portion 16B of the inner shaft 16. A pair of left-hand and right-hand bead locking mechanisms 56, 58 are screwed on the left-hand screw 52 and the right-hand screw 54, respectively. It should be noted that the pair of bead locking mechanisms 56, 58 are well known and i description thereof will be omitted.

The pair of bead locking mechanisms 56, 58 are provided to be capable of moving by a predetermined distance in directions of approaching and separating from each other (the directions indicated by double-headed arrow B in FIG. 1) due to the rotational difference between the inner shaft 16 and the main shaft 14.

Engaging portions 60 are formed at an intermediate portion of the inner shaft 16. The inner shaft 16 can be divided at the engaging portion 60. Connecting portions 62 are formed on the main shaft 14 at a position opposed to the engaging portions 60. The connecting portions 62 are connected to each other by a connecting member such as a bolt. The main shaft 14 can be divided at the connecting portion 62.

Next, an operation of the present embodiment will be described in the driving apparatus 10 of the tire forming drum according to the present embodiment, a state in which rotation of the main shaft 14 is prevented by the disc brake 48 is canceled and the main shaft 14 is rotated by the main shaft rotating motor 42, so that the pair of bead locking mechanisms 56, 58 rotate on the axis of the inner shaft 16 (i.e., in the directions indicated by double-headed arrow A in FIG. 1). At this time, when the main shaft 14 and the inner shaft 16 are brought into a non-connected state by the clutch 18 and the inner shaft 16 is rotated by the distance-between-beads changing motor 34, the pair of beads locking mechanisms 56,58 screwed on the inner shaft 16 move along the axial line or the inner shaft 16 in directions of approaching and separating from each other (the directions of double-headed arrow B in FIG. 1).

Meanwhile, the pair of bead locking mechanisms 56, 58 are moved in directions of approaching each other by forward rotation of the distance-between-beads changing motor 34. By switching the rotation of the distance-between-beads changing motor 34 from forward to reverse rotation, the bead locking mechanisms 56, 58 are moved in directions of separating from each other. Note that the opposite construction is possible, i.e., the bead locking mechanisms 56, 58 may be moved in directions of separating from each other by forward rotation of the motor 34 and vice-versa.

At this time, the differential gear unit 22 connected both to the inner shaft 16 and the main shaft 14 operates and the distance between the pair of bead locking mechanisms 56, 58 is detected by the encoder 32 connected to the differential gear unit 22 due to the rotational difference between the inner shaft 16 and the main shaft 14.

For this reason, by controlling the distance-between-beads changing motor 34 based on a detection value of the encoder 32, the inner shaft 16 is rotated to move the pair of bead locking mechanisms 56, 58 in the directions of double-headed arrow B, while the main shaft 14 is rotated to rotate the pair of bead Locking mechanisms 56, 58 in the directions of double-headed arrow A.

When the distance between the pair of bead locking mechanisms 56, 58 becomes a predetermined value, rotation of the inner shaft 16 is stopped by the distance-between-beads fixing brake 36 to keep the predetermined distance value between the pair of bead locking mechanisms 56, 58, and the main shaft 14 and the inner shaft 16 are brought into a connected state by the clutch 18 so that the shaft section 12 rotates in the directions of double-headed arrow A.

In addition, in order to stop rotation of the shaft section 12, rotation of the main shaft 14 is stopped by the disc brake 48.

Accordingly, in the driving apparatus 10 of the tire forming drum according to the present embodiment, when tire forming, the main shaft 14 is rotated to rotate the pair of bead locking mechanisms 56, 58 in the directions of double-headed arrow A, and at the same time, the inner shaft 16 is rotated to rotate the pair of bead locking mechanisms 56, 58 in the directions of double-headed arrow B. For this reason, differing from a conventional driving apparatus of the tire forming drum, because the centrifugal force due to the rotations of the bead locking mechanisms acts on the entire beads, deformation of the bead occurs over the circumference of the bead, namely, occurs uniformly along the direction of double-headed arrow A in FIG. 1, and a belt and a tread are adhered uniformly along a circumferential direction of a green tire. This result in improvement in uniformity of the green tire.

Meanwhile, in the driving apparatus 10 of the tire forming drum according to the present embodiment, when only the inner shaft 16 is rotated by the distance-between-beads changing motor 34 in a state in which rotation of the main shaft 14 is prevented by the disc brake 48 and the main shaft 14 and the inner shaft 16 are set in a non-connected state by the clutch 18, the pair of bead locking mechanisms 56, 58 do not rotate in the directions of double-headed arrow A in FIG. 1, and move only in the directions of double-headed arrow B in FIG. 1.

With the above-described construction, the present invention has an excellent effect in that rotation of the pair of bead locking mechanisms and movement thereof in the directions of approaching and separating from each other can be effected simultaneously.

While the embodiment of the present invention, as herein disclosed, constitutes a preferred form, it is to be understood that other forms might be adopted.

What is claimed is:

1. A driving apparatus of a tire forming drum, comprising:
   a shaft section having a main shaft and an inner shaft which is rotatably inserted into an interior of the main shaft;
   main shaft rotating means for rotating the main shaft;
   main-shaft rotation stopping means which prevents rotation of the main shaft;
   a clutch for switching a state of the main shaft and the inner shaft between a connected state and a non-connected state;
   inner shaft rotating means for rotating the inner shaft;
   a pair of bead locking mechanisms engaged on the inner shaft in such a manner to be axially movable along an axial line of the inner shaft in directions of approaching and separating from each other and simultaneously rotating in a direction of rotation of said main shaft;
   a differential gear unit connected both to the inner shaft and the main shaft; and
   distance-between-beads detecting means which is connected to said differential gear unit and detects an interval between said pair of bead locking mechanisms from a rotational difference between the inner shaft and the main shaft.

2. A driving apparatus of a tire forming drum according to claim 1, wherein said distance-between-beads detecting means is an encoder.

3. A driving apparatus of a tire forming drum according to claim 1, wherein said inner shaft rotating means is a motor for changing a distance between beads, which can rotate forwardly and reversely.

4. A driving apparatus of a tire forming drum according to claim 1, wherein said main shaft rotating means is a motor for rotating the main shaft.

5. A driving apparatus of a tire forming drum according to claim 4, wherein the motor for rotating the main shaft is provided to transmit rotating force to the main shaft by connecting a sprocket fixed to a drive shaft of the motor and a sprocket fixed to an intermediate portion of the main shaft via a chain.

6. A driving apparatus of a tire forming drum according to claim 1, wherein said main-shaft rotation stopping means is a disc brake.

7. A driving apparatus of a tire forming drum according to claim 6, wherein the disc brake includes a disc rotor mounted at an intermediate portion of the main shaft.

8. A driving apparatus of a tire forming drum according to claim 1, wherein said clutch is provided between respective one ends of the main shaft and the inner shaft.

9. A driving apparatus of a tire forming drum according to claim 1, wherein said pair of bead locking mechanisms are engaged on a left-hand screw and a right-hand screw which are formed on an end of the inner shaft.

10. A driving apparatus of a tire forming drum according to claim 1, wherein engaging portions are formed at an intermediate portion of the inner shaft so as to be capable of dividing the inner shaft, and connecting portions are formed on the main shaft at a position opposed to the engaging portions so as to be capable of dividing the main shaft, the connecting portions being connected to each other by a connecting member.

11. A driving apparatus of a tire forming drum, comprising:
    a shaft section having a main shaft and an inner shaft which is rotatably inserted into an interior of the main shaft;
    a main shaft rotating motor for rotating the main shaft;
    a disc brake which prevents rotation of the main shaft;
    a clutch for switching a state of the main shaft and the inner shaft between a connected state and a non-connected state;
    a motor for changing a distance between beads, the motor being capable of effecting forward and reverse rotation so as to rotate the inner shaft;
    a pair of bead locking mechanisms engaged on the inner shaft in such a manner to be axially movable along an axial line of the inner shaft in directions of approaching and separating from each other and simultaneously rotating in a direction of rotation of said main shaft;
    a differential gear unit connected both to the inner shaft and the main shaft; and
    an encoder which is connected to said differential gear unit and detects an interval between said pair of bead locking mechanisms from a rotational difference between the inner shaft and the main shaft.

12. A driving apparatus of a tire forming drum according to claim 11, wherein the motor for rotating the main shaft is provided to transmit rotating force to the main shaft by connecting a sprocket fixed to a drive shaft of the motor and a sprocket fixed to an intermediate portion of the main shaft via a chain.

13. A driving apparatus of a tire forming drum according to claim 11, wherein the disc brake includes a disc rotor mounted at an intermediate portion of the main shaft.

14. A driving apparatus of a tire forming drum according to claim 11, wherein said clutch is provided between respective one ends of the main shaft and the inner shaft.

15. A driving apparatus of a tire forming drum according to claim 11, wherein said pair of bead locking mechanisms are engaged on a left-hand screw and a right-hand screw which are formed on an end of the inner shaft.

16. A driving apparatus of a tire forming drum according to claim 11, wherein engaging portions are formed at an intermediate portion of the inner shaft so as to be capable of dividing the inner shaft, and connecting portions are formed on the main shaft at a position opposed to the engaging portions so as to be capable of dividing the main shaft, the connecting portions being connected to each other by a connecting member.

17. A driving apparatus of a tire forming drum, comprising:
    a shaft section having a main shaft and an inner shaft which is rotatably inserted into an interior of the main shaft;
    a main shaft rotating motor connected via a chain to a sprocket fixed to an intermediate portion of the main shaft to rotate the main shaft;
    a disc brake including a disc rotor mounted at an intermediate portion of the main shaft to prevent rotation of the main shaft;
    a clutch for switching a state of the main shaft and the inner shaft between a connected state and a non-connected state;
    a motor for changing a distance between beads, the motor being capable of effecting forward and reverse rotation so as to rotate the inner shaft;

a pair of bead locking mechanisms engaged on the inner shaft in such a manner to be axially movable along an axial line of the inner shaft in directions of approaching and separating from each other and simultaneously rotating in a direction of rotation of said main shaft;

a differential gear unit connected both to the inner shaft and the main shaft; and an encoder which is connected to said differential gear unit and detects an interval between said pair of bead locking mechanisms from a rotational difference between the inner shaft and the main shaft.

18. A driving apparatus of a tire forming drum according to claim 17, wherein said clutch is provided between one end of the main shaft and one end of the inner shaft.

19. A driving apparatus of a tire forming drum according to claim 17, wherein said pair of bead locking mechanisms are engaged on a left-hand screw and a right-hand screw which are formed on an end of the inner shaft.

20. A driving apparatus of a tire forming drum according to claim 17, wherein engaging portions are formed at an intermediate portion of the inner shaft so as to be capable of dividing the inner shaft, and connecting portions are formed on the main shaft at a position opposed to the engaging portions so as to be capable of dividing the main shaft, the connecting portions being connected to each other by a connecting member.

* * * * *